(12) United States Patent
Patil et al.

(10) Patent No.: US 11,683,359 B2
(45) Date of Patent: Jun. 20, 2023

(54) METHODS AND SYSTEMS FOR PERSISTENT COMMUNICATIONS BETWEEN CLIENT APPLICATIONS AND APPLICATION SERVERS

(71) Applicant: INTUIT INC., Mountain View, CA (US)

(72) Inventors: Nikita Prakash Patil, Mountain View, CA (US); Waseem Akram Syed, San Jose, CA (US); Muralidhar Kattimani, San Jose, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/389,672

(22) Filed: Jul. 30, 2021

(65) Prior Publication Data
US 2023/0031140 A1 Feb. 2, 2023

(51) Int. Cl.
*H04L 67/01* (2022.01)
*H04L 67/63* (2022.01)
*H04L 67/02* (2022.01)
*H04L 67/147* (2022.01)

(52) U.S. Cl.
CPC .............. *H04L 67/01* (2022.05); *H04L 67/02* (2013.01); *H04L 67/147* (2013.01); *H04L 67/63* (2022.05)

(58) Field of Classification Search
CPC ....... H04L 67/42; H04L 67/02; H04L 67/147; H04L 67/327
See application file for complete search history.

(56) References Cited

U.S. PATENT DOCUMENTS

| 7,881,335 | B2 * | 2/2011 | Deshpande | ........ H04N 21/6373 370/465 |
| 2006/0075116 | A1 * | 4/2006 | Chitilian | ............... H04L 69/329 709/227 |
| 2021/0392097 | A1 * | 12/2021 | Ahmed | ................ H04L 51/046 |

* cited by examiner

*Primary Examiner* — Cheikh T Ndiaye
(74) *Attorney, Agent, or Firm* — Patterson + Sheridan, LLP

(57) ABSTRACT

Certain aspects of the present disclosure provide techniques for communicating between an application executing on a client device and a server using a persistent connection. An example method generally includes initializing a persistent connection between an application executing on a client device and a server. Information about an event within the application is received. Communications between the application and the server are performed via streaming data related to the information about the event carried on the persistent connection. Generally, the streaming data may be translated from an application-native format to a platform-agnostic format and may include application-specific information. One or more actions are taken within the application based on the streaming data related to the event and carried on the persistent connection.

17 Claims, 6 Drawing Sheets

METHODS AND SYSTEMS FOR PERSISTENT COMMUNICATIONS BETWEEN CLIENT APPLICATIONS AND APPLICATION SERVERS

INTRODUCTION

Aspects of the present disclosure relate to the communications between client applications and application servers, and more specifically to persistent bidirectional communications between client applications and application servers.

BACKGROUND

Software applications may be implemented in a client-server paradigm in which a client application provides a user interface and, in some cases, device-specific functionality (e.g., functionality related to devices integrated with or connected to a device on which the client application executes), and in which the client application communicates with an application service deployed on one or more servers. The application service may generally execute various operations to perform a specified task based on information provided to the application service from the client application. Various communications techniques can be used to pass information between the client application and the application service. For example, information can be exchanged between the application service and the client application using reliable protocols such as the Transmission Control Protocol (TCP) that attempt to ensure successful transmission of data. Messages that are latency-sensitive, such as multimedia data, may be exchanged using connectionless protocols such as the User Datagram Protocol (UDP) in which failed transmissions are not retransmitted.

In many cases, communications links between the client application and the application service may be unidirectional communications links and may be established for each session in which messages are exchanged from a transmitting device to a receiving device. For example, to submit information gathered in a first step of a workflow and initiate a move to a second step of the workflow, a first communication link may be established between the client application and the application service to transmit the information gathered in the first step of the workflow. Correspondingly, the application service can establish a second communication link to transmit information about the second step of the workflow to the client application for execution and display on a device on which the client application executes. Additionally, these communications links may be terminated when the transmitting device has completed transmitting the data. Thus, bidirectional communications between a client application and an application service may impose a significant processing overhead in repeatedly establishing and terminating communication links between the client application and the application service.

Thus, techniques are needed for efficiently communicating between client applications and application services.

BRIEF SUMMARY

Certain embodiments provide a computer-implemented method for communicating between an application executing on a client device and a server using a persistent connection. An example method generally includes initializing a persistent connection between an application executing on a client device and a server. Information about an event within the application is received. Communications between the application and the server are performed via streaming data related to the information about the event carried on the persistent connection. Generally, the streaming data may be translated from an application-native format to a platform-agnostic format and may include application-specific information. One or more actions are taken within the application based on the streaming data related to the event and carried on the persistent connection.

Still further embodiments provide a computer-implemented method for communicating between an application executing on a client device and a server using a persistent connection. An example method generally includes initializing a persistent connection between an application executing on a client device and a server. Generally, to initialize the persistent connection, an instance of a web view may be instantiated within the application. A web page may be loaded in the instance of the web view, and a subscription to a messaging service may be instantiated. The messaging service may generally be configured to listen for data from and publish data to the server via the persistent connection. Information about an event within the application is received. Communications between the application and the server are performed via streaming data related to the information about the event carried on the persistent connection. Generally, the streaming data may be translated from an application-native format to a platform-agnostic format and may include application-specific information. One or more actions are taken within the application based on the streaming data related to the event and carried on the persistent connection.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
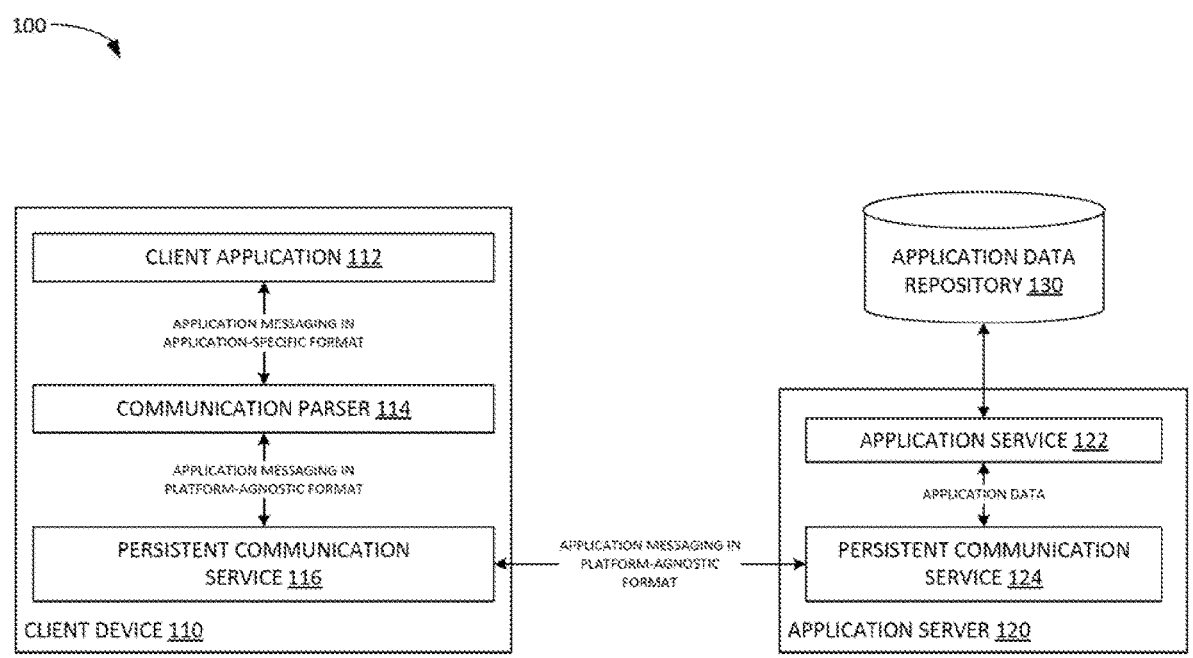
FIG. 1 depicts an example computing environment in which a persistent, bidirectional, communications link is established and used to communicate between a client application executing on a client device and an application service executing on a server.

In various situations where a client application executing on a client device communicates with backend application services at a remote location (e.g., a server or cluster of servers, cloud compute resources, etc.) to execute a function within the application, the client application and the backend application services generally communicate via unidirectional communication links that are established each time data is to be transmitted from one endpoint to the other endpoint. These communications are generally performed using standardized protocols, such as the hypertext transfer protocol (HTTP) over TCP or various media streaming protocols over UDP. Because communications links are typically established each time data is to be transmitted between the client application and the backend application services, communications between the client application and the backend application services generally impose a significant processing overhead on the client device and the compute resources on which the backend application services execute. For example, establishing a communication link between the client application and the backend application service may use processing resources, network resources, memory, and other compute resources on one or both of the client device and the compute resources on which the backend application service executes. Additionally, because these communications links are generally established for a single message or set of related messages between the client application and the backend application services, significant amounts of computing resources may be expended in repeatedly establishing communications links between the client application and the backend application services.

To improve resource utilization and reduce the potential for link establishment failure, a persistent connection can be established between the client application and backend application services. With a persistent connection, a single connection can be established for communications between the client application and the backend application services. This single connection can be used through the application lifecycle, from application initialization to application termination on the client device, for bidirectional communications between the client application and the backend application services. Because this single connection is generally not terminated at the conclusion of any particular message exchange between the client application and the backend application services, computing resources need not be expended to repeatedly initialize and tear down communications links between the client application and the backend application services. However, persistent connection protocols, such as RSocket, may not be natively supported by client devices on which client applications execute.

Aspects of the present disclosure provide techniques for supporting communications between an application executing on a client device and an application service executing on a remote computing platform, such as a server or a cloud service, using a persistent bidirectional connection between the client device and the remote computing platform. As discussed in further detail herein, a persistent bidirectional connection between the client device and the remote computing platform can be established using a web view (e.g., an embedded web browser) through which messages in a platform-agnostic format can be exchanged between the application and the application service. The persistent bidirectional connection can be used for communicating various types of data, such as messaging for which a response is requested, streaming audiovisual data, and the like. By establishing a persistent bidirectional connection between an application executing on a client device and an application service executing on a remote computing platform, aspects presented herein generally reduce processing resources, network resources, memory, and other computing resources used in communicating between the client device and the application service. Further, because a persistent communication channel may be established one and may remain active until application termination, aspects presented herein may reduce power utilization at a client device, as the client application executing on the client device may not need to repeatedly establish connections with the application service executing on the server. This may be particularly beneficial in the context of mobile devices as significant communication power can be saved using aspects described herein, thus leading to better device battery life. Thus, aspects of the present disclosure may also improve battery life of client devices on which a client application executes.

Example Communications Between a Client Application and an Application Service Using a Persistent Communication Service FIG. 1 illustrates an example computing environment 100 in which a client application executing on a client device communicates with an application service executing on an application server using a persistent bidirectional communication link. As illustrated, computing environment 100 includes a client device 110 and an application server 120.

Client device 110 is generally representative of a computing device on which a user-facing client application can execute, such as a desktop computer, a laptop computer, a smartphone, a tablet, or other computing device. As illustrated, client device 110 includes a client application 112, a communication parser 114, and a persistent communication service 116.

Client application 112 generally represents an application that allows a user to invoke functions at an application service 122 executing on application server 120 to perform one or more operations exposed by the application service 122. Generally, client application 112 may present a user interface to a user of client device 110 through which information can be provided to application service 122 and in which information received from application service 122 can be displayed to a user. To transmit information to application service 122 using a persistent connection, as illustrated, client application 112 can exchange application messaging in an application-specific format to a communication parser 114, which may translate the application messaging into a platform-agnostic format and pass the application messaging in the platform-agnostic format to the persistent communication service for transmission to the application service 122. Similarly, to receive information from application service 122 using the persistent connection, the client application 112 can receive messaging in an application-specific format from communication parser 114.

In some aspects, client application 112 may include event listeners bound to one or more components of the client application 112. Generally, an event listener is a function within client application 112 that monitors for the occurrence of specified events within client application 112. Some event listeners may be bound to user interface elements displayed in a graphical user interface rendered on a display connected with or integral to client device 110. When an event listener detects that an event has been invoked (e.g., that a user has interacted with a user interface component), the event listener can execute one or more functions to invoke a function at the client application 112 or application service 122. For example, if the event listener detects that a button to activate a data ingestion process through a camera connected with or integral to client device 110 has been pressed, the event listener can execute one or more functions to display a user interface for capturing an image of a document and can activate the camera connected with or integral to client device 110. In another example, when the event listener detects that a user interface element that triggers invocation of a function at application service 122 has been pressed, the event listener can generate one or more messages to transmit user input to application service 122 and invoke the function associated with the user interface elements at application service 122. Generally, the one or more messages may be formatted in an application-specific format and may be dispatched to communication parser 114 for translation into a platform agnostic format prior to transmission to application server 120 via the persistent bidirectional connection between client device 110 and application server 120.

In some aspects, event listeners in client application 112 may be configured to listen for and react to messaging received from application service 122. This messaging may include, for example, messaging for transmitting streaming data over a streaming data protocol, such as media data (or audiovisual data) communicated between client device 110 and application server 120. Upon receipt of streaming data from the application server, after having been translated from a platform-agnostic format to an application-specific format by communication parser 114, client application 112 can process the received messaging and present the content encapsulated in the received messaging to a user of client application 112 (e.g., output audio and/or video content to audiovisual output devices connected with or integral to client device 110).

In some aspects, to initialize a persistent connection between client device 110 and application server 120, client application 112 can load a web view, or embedded web browser, in which a web page can be loaded. This web view may be hidden from the user of client application 112 (e.g., rendered off-screen or otherwise made invisible). Within this web view, client application 112 can load a web page associated with persistent communication service 124 at application server 120. Through the web page, client application 112 can subscribe to a messaging service (e.g., persistent communication service 116) configured to listen for data from and publish data to application server 120 via the persistent connection. In some aspects, to terminate the persistent connection, client application 112 can terminate the subscription to the messaging service through the web page. After the subscription to the messaging service is terminated, execution of client application 112 can be terminated.

Communication parser 114 generally can translate messaging between an application-specific format to a platform-agnostic format for transmission to application server 120 via a persistent connection between the client application 112 and the application service 122. In some aspects, communication parser 114 can use a mapping between application-specific information and a payload to be encapsulated in the messages carried on the persistent connection between the client application 114 and the application service 122. For example, a persistent connection may support a limited number of functions, such as functions to push messages to application service 122, pull data from application service 122, or listen for asynchronous (e.g., pushed) messaging from application service 122.

Generally, messaging received at communication parser 114 from client application 112 via persistent communication service 116 may specify a function to invoke at application service 122 and may include data to be used by application service 122 during execution of the specified function. The mapping from the application-specific format to the platform-agnostic format may include a mapping from application-specific messaging to a push request to place data on the persistent connection for transmission to application service 122. In some aspects, the messaging received from client application 112 may be encapsulated as the payload of a message in a platform-agnostic format for transmission by persistent communication service 116 via the persistent connection between the client application 112 and the application service 122.

For messaging received at communication parser 114 from application service 122, communication parser 114 generally translates the application messaging from a platform-agnostic format to an application-specific format. In translating the application messaging, communication parser 114 can, in some aspects, use a mapping between received messages and functions to invoke in client application 112 to generate and dispatch application messaging in an application-specific format to client application 112. For example, communication parser 114 can identify one or more actions to perform within client application 112 (e.g., by invoking one or more functions of client application 112). Communication parser 114 can then invoke one or more functions to execute the identified actions within client application 112. In some aspects, the payloads of the platform-agnostic messaging received from application service 122 via the persistent connection may include parameters for the application to use in executing the one or more functions associated with the identified actions within client application 112.

Persistent communication service 116 generally allows for the instantiation of a persistent connection between client application 112 and application service 122, transmission of messages on the persistent connection, and eventual termination of the persistent connection. As discussed, persistent communication service 116 may be hosted in a web view, or embedded web browser, that is hidden from the user of client application 112. By using a web view (or embedded web browser) to host persistent communication service 116, the persistent communication service 116 can remain active and allow for communications via a persistent connection until such time as the client application 112 is terminated. Persistent communication service 116 may be initiated by the client application 112 instantiating a web view and loading, within the web view, a web page associated persistent communication service 124. Through this web page, persistent communication service 116 can subscribe to messaging from persistent communication service 124 to allow for messages to be published by client device 110 on the persistent connection and to allow for published messages to be received and read by persistent communication service 116.

Application server 120 is generally representative of one or more physical or virtual computing devices on which an application may be executed. Application server 120, as illustrated, includes an application service 122 and a persistent communication service 124.

Generally, application service 122 exposes one or more functions that may be invoked by messaging received from client application 112 to perform specified actions with respect to data received from client application 112 and/or stored in an application data repository 130 in which application service 122 stores application data. In some aspects, application service 122 may host various streaming data services, such as voice communications services, video communications services, or other multimedia services for exchanging media data between client application 112 and application service 122.

Generally, application service 122 may publish messaging to persistent communication service 124 for transmission to client application 112 via a persistent connection. This messaging generally includes information to be displayed to a user of client application 112 or information to be used in determining what to display to the user of client application 122.

Application service 122 may also receive messaging from client application 112 via persistent communication service 124. This messaging generally includes information identifying one or more functions to invoke within application service 122 and may include data that can be used as parameters of the identified one or more functions. After execution of the identified one or more functions in application service 122, application service 122 can generate response messaging to be communicated to client application 112 via persistent communication service 124.

Persistent communication service 124 generally exposes a persistent connection through which client application 112 and application service 122 communicate. Similarly to persistent communication service 116, persistent communication service 124 can receive application messaging in a platform-agnostic format, translate the received messaging into application data in an application-specific format, and dispatch the application data in the application-specific format to application service 122 for processing. Likewise, persistent communication service 124 can receive application data in an application-specific format from application service 122, translate the application data into messaging in a platform-agnostic format, and dispatch the messaging to client application 112 via persistent communication service 116.

Figure 2:
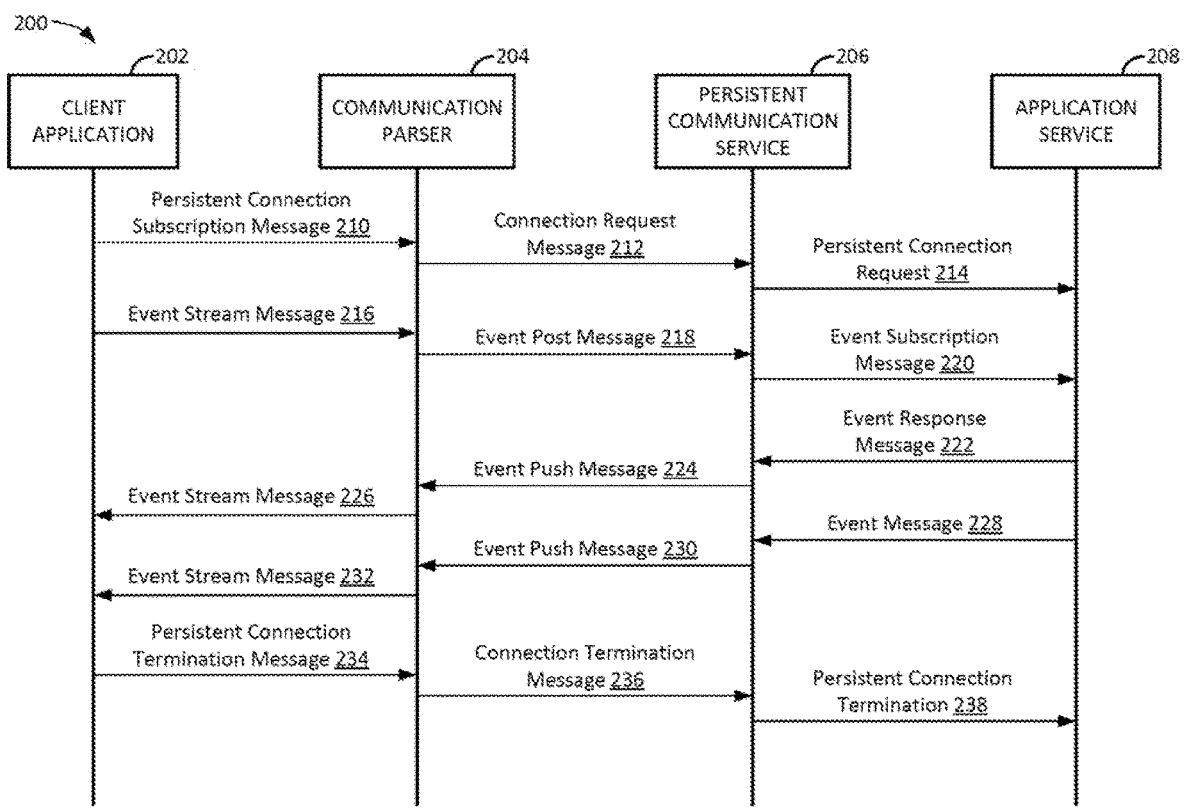
FIG. 2 illustrates an example of messages exchanged between a client application, a communication parser, a persistent communication service, and an application service to allow for communications between the client application and the application service using a persistent, bidirectional communications link.

Example Communications Between a Client Application and an Application Service Using a Persistent Communication Service FIG. 2 illustrates an example of messages exchanged between a client application 202, a communication parser 204, a persistent communication service 206, and an application service 208 to allow for communications between the client application and the application service using a persistent, bidirectional communications link. Generally, client application 202 may correspond to client application 112 illustrated in FIG. 1; communication parser 204 may correspond to communication parser 114 illustrated in FIG. 1; persistent communication service 206 may correspond to persistent communication service 116 illustrated in FIG. 1; and application service 208 may correspond to application service 122 illustrated in FIG. 1. While the messaging illustrated in FIG. 2 illustrates unidirectional messaging, it should be recognized that connections between client application 202, communication parser 204, persistent communication service 206, and application service 208 may be performed using bidirectional communication links between these components.

As illustrated, when client application 202 is instantiated, client application 202 instantiates a persistent connection with application service 208 to exchange messages, receive data from application service 208, and invoke functions at application service 208 based on data provided from client application 202. To instantiate the persistent connection with application service 208 (e.g., after the hidden web view has been instantiated for use in subscripting to and listening for messaging on the persistent connection, as discussed above), client application 202 can transmit a persistent connection subscription message 210 to communication parser 204. The persistent connection subscription message generally identifies a location of a resource associated with a persistent connection between client application 202 and application service 208. Communication parser 204 can translate persistent connection subscription message 210 to a connection request message 212, formatted in a platform-agnostic manner, and transmit the connection request message 212 to persistent communication service 206. Persistent communication service 206 may then transmit a persistent connection request 214 to application service 208 to establish the persistent connection between client application 202 and application service 208.

After the persistent connection is established between client application 202 and application service 208, client application 202 and application service 208 can communicate via the persistent connection to invoke one or more functions at the opposite end of the persistent connection. As illustrated, an event may occur at client application 202, which prompts the generation and transmission of event stream message 216 to communication parser 204. This event stream message 216 is generally formatted in an application-specific format and may include information about the event invoked at client application 202, data to be transferred to application service 208 for processing, a function to invoke at application service 208, and the like. Communication parser 204 can translate event stream message 216 into event post message 218, which may be formatted in a platform-agnostic format, and transmit the event post message 218 to persistent communication service 206 for transmission via the persistent connection to application service 208. Persistent communication service can generate an event subscription message 220 and dispatch the event subscription message 220 to application service 208.

In some aspects, as illustrated, application service 208 can generate an event response message 222 in response to receiving event subscription message 220. The response may include, for example, information identifying an action to perform at client application 202, data to display within client application 202, and the like. Application service 208 places the event response message 222 on the persistent connection, and persistent communication service 206 can receive the event response message 222. Persistent communication service 206 can generate an event push message 224 and dispatch this message to communication parser 204, which translates the event push message 224 into an event stream message 226, which is formatted in an application-specific format. Client application 202 can receive event stream message 226 from communication parser 204 and invoke a function at client application 202.

In some aspects, application service 208 can push information and/or a request to execute a function at client application 202 asynchronously. For example, application service 208 can asynchronously push requests to invoke a function, push streaming media data, or the like to client application 202. In such a case, application service 208 need not receive a message from client application 202 to prompt the generation and transmission of a response message by application service 208. As illustrated, application service 208 can place an event message 228, formatted in a platform-agnostic format, on the persistent connection. Persistent communication service can generate an event push message 230 from event message 228 and provide the event push message to communication parser 204, which may then translate the event push message 230 into event stream message 232 and dispatch the event stream message 232 for processing by client application 202.

At some later point in time, to terminate client application 202, client application 202 generally terminates the persistent connection with application service 208. To terminate the persistent connection, client application 202 transmits a persistent communication termination message 234 to communication parser 204. Communication parser 204 translates the persistent connection termination message 234 from an application-specific format into a connection termination message 236 formatted in a platform-agnostic format. Communication parser 206 transmits connection terminate message 236 to persistent communication service 206, which transmits persistent connection termination 238 to application service 208 to terminate a subscription to the persistent connection. After the persistent connection is terminated, client application 202 may be terminated.

Figure 3:
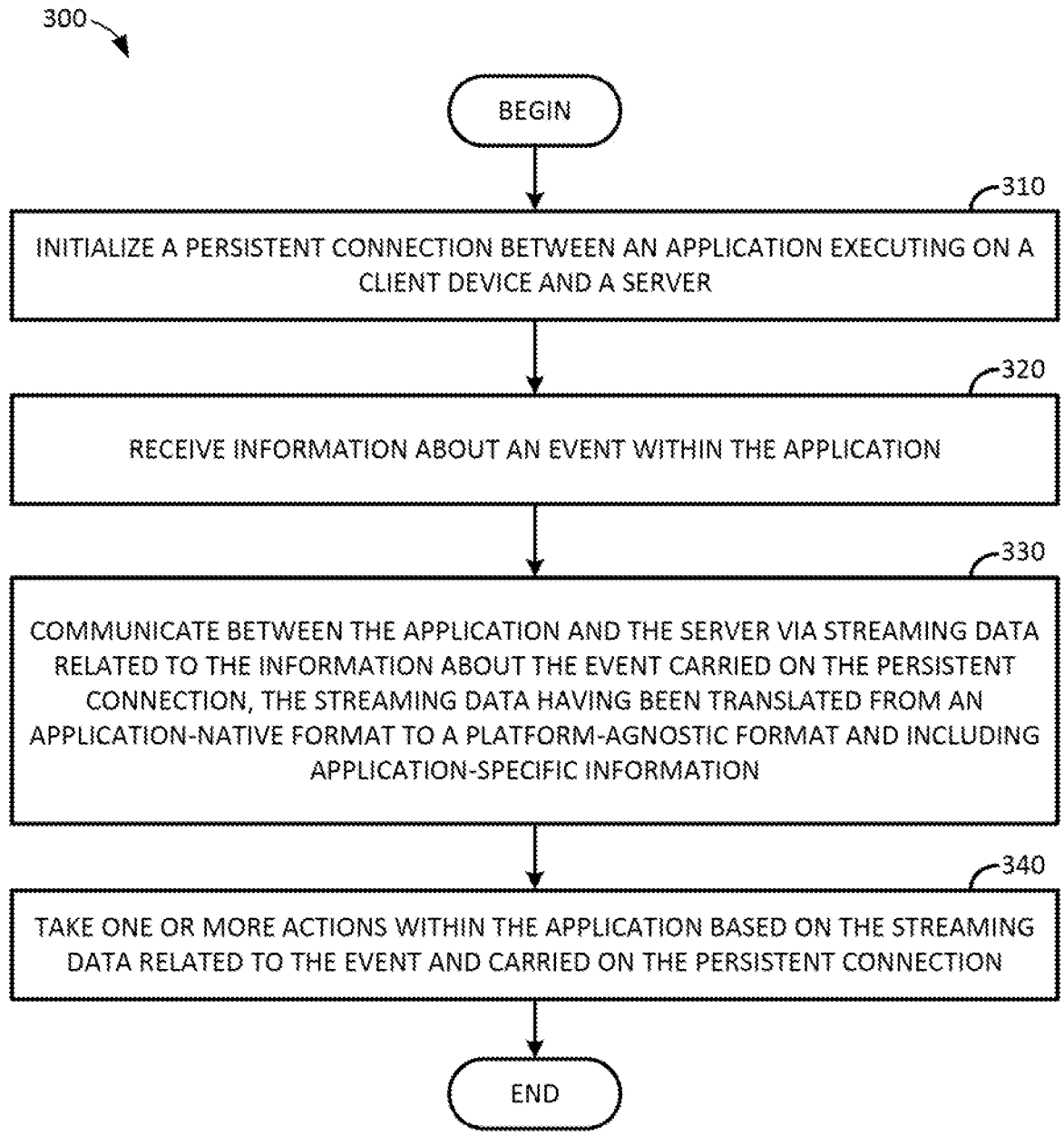
FIG. 3 illustrates example operations for communicating between a client application and an application service using a persistent, bidirectional communications link.

Example Computer Implemented Method for Communicating Between a Client Application and an Application Service Using a Persistent Communication Service FIG. 3 illustrates example operations 300 for communicating between a client application and an application service using a persistent connection through a persistent communication service. Operations 300 may be performed, for example, by client application 112, communication parser 114, and persistent communication service 116 illustrated in FIG. 1.

As illustrated, operations 300 begin at block 310, in which a persistent connection is initialized between an application executing on a client device and a server. The persistent connection generally includes a bidirectional connection between the application and the server such that the application can transmit data to the server and receive data from the server on the same connection. In some aspects, the persistent connection may be a connection over which the application and the server communicate via a streaming protocol. The data carried on the persistent connection may include, for example, messaging related to events within the application (e.g., to invoke functions at a client application or an application service) or media data (e.g., audiovisual information, such as voice or video communications data) transferred between the application and the server.

At block 320, information about an event within the application is received. The information about the event within the application may include, for example, information about an action invoked by a user of a client application by interacting with one or more user interface elements displayed in a graphical user interface rendered by a client device on which the client application is executing. In some aspects, the information about the event within the application may include an indication of an asynchronous message having been placed on the persistent connection by the application service.

At block 330, the application and the server communicate via streaming data related to the information about the event carried on the persistent connection. The streaming data may have been translated from an application-native format to a platform-agnostic format and including application-specific information.

In some aspects, to communicate between the application and the server, messaging may be generated based on a mapping between the application-specific information and a payload to be encapsulated in the messages transmitted on the persistent connection. These messages may then be transmitted to the server on the persistent connection. The one or more messages may include information identifying an event within the application to be executed and one or more parameters for the server to use in executing a function related to the event.

In some aspects, to communicate between the application and the server, the application may receive, on the persistent connection, messages from the server. The messages may include payloads formatted in the platform-agnostic format. These messages may include information identifying an event within the application to be executed and one or more parameters for the server to use in executing a function related to the event.

At block 340, one or more actions are taken within the application based on the streaming data and carried on the persistent connection. Generally, the one or more actions includes invoking a function in the client application or at an application service, and the invoked function may use the streaming data carried on the persistent connection as parameters for executing the function. In some aspects, where the streaming data includes media data, the one or more actions generally include presenting the media data via one or more output devices connected with or integral to a client device on which the application executes.

Figure 4:
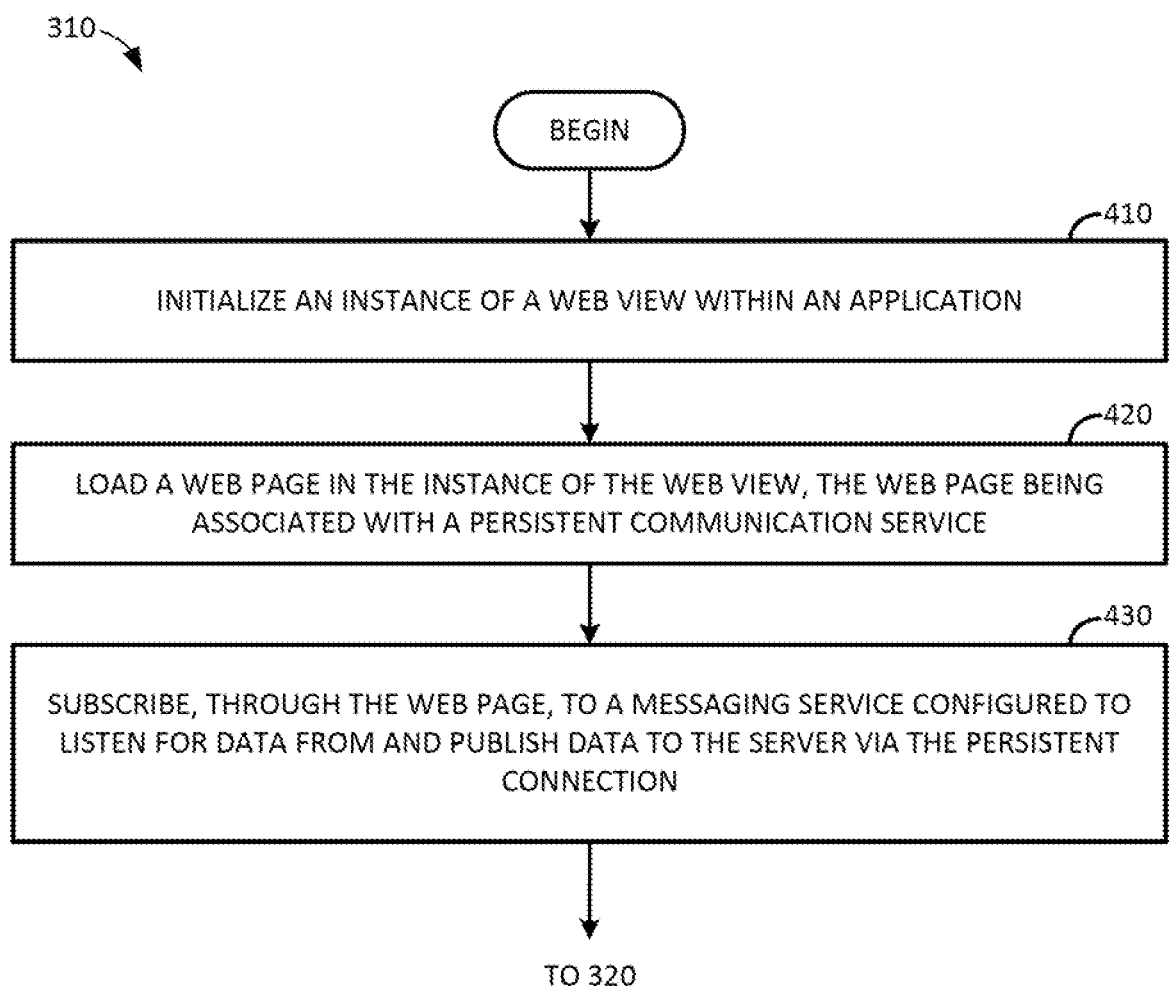
FIG. 4 illustrates example operations for establishing a persistent, bidirectional communications link between a client application and an application service.

FIG. 4 illustrates further details of block 310 illustrated in FIG. 3 for initializing a persistent connection between the application executing on the client device and the server. As illustrated, block 310 may begin at block 410, where an instance of a web view is initialized within the application. The web view may be, for example, an embedded web browser and may be hidden from a user of the application so that various operations with respect to the persistent connection can be performed without the user seeing these operations or accidentally terminating the persistent connection (e.g., by closing the web view). In some aspects, the web view may be configured to translate streaming data events received from the application into a stream protocol-specific format for transmission over the persistent connection.

At block 420, a web page is loaded in an instance of the web view. The web page may be, for example, a page associated with an application service with which persistent communications can be performed. Generally, the web page may be specified in a request by the application to initialize the instance of the web view or may be defined a priori.

At block 430, a subscription to a messaging service is established. The messaging service is generally configured to listen for data from the server and publish data to the server via the persistent connection. Operations may then proceed to block 320, as illustrated in FIG. 3 and discussed above.

Generally, the persistent connection established through the web view (e.g., an embedded web browser included as a component in or connected with a client application) may be active until the client application is terminated. During the application termination process, the subscription to the messaging service may be terminated through the web page in the instance of the web view. For example, to terminate the subscription to the messaging service, a message may be transmitted through the web page in the instance of the web view to halt communications on the messaging service. The message may indicate a time at which the persistent connection is to be terminated (e.g., if application termination is scheduled for a specified time), may indicate how the server is to handle any pending messages awaiting transmission to the client application (e.g., that the server is to transmit these pending messages prior to terminating the connection or that the server is to drop these pending messages), and the like. After the persistent connection is terminated, execution of the client application may then be terminated.

Figure 5:
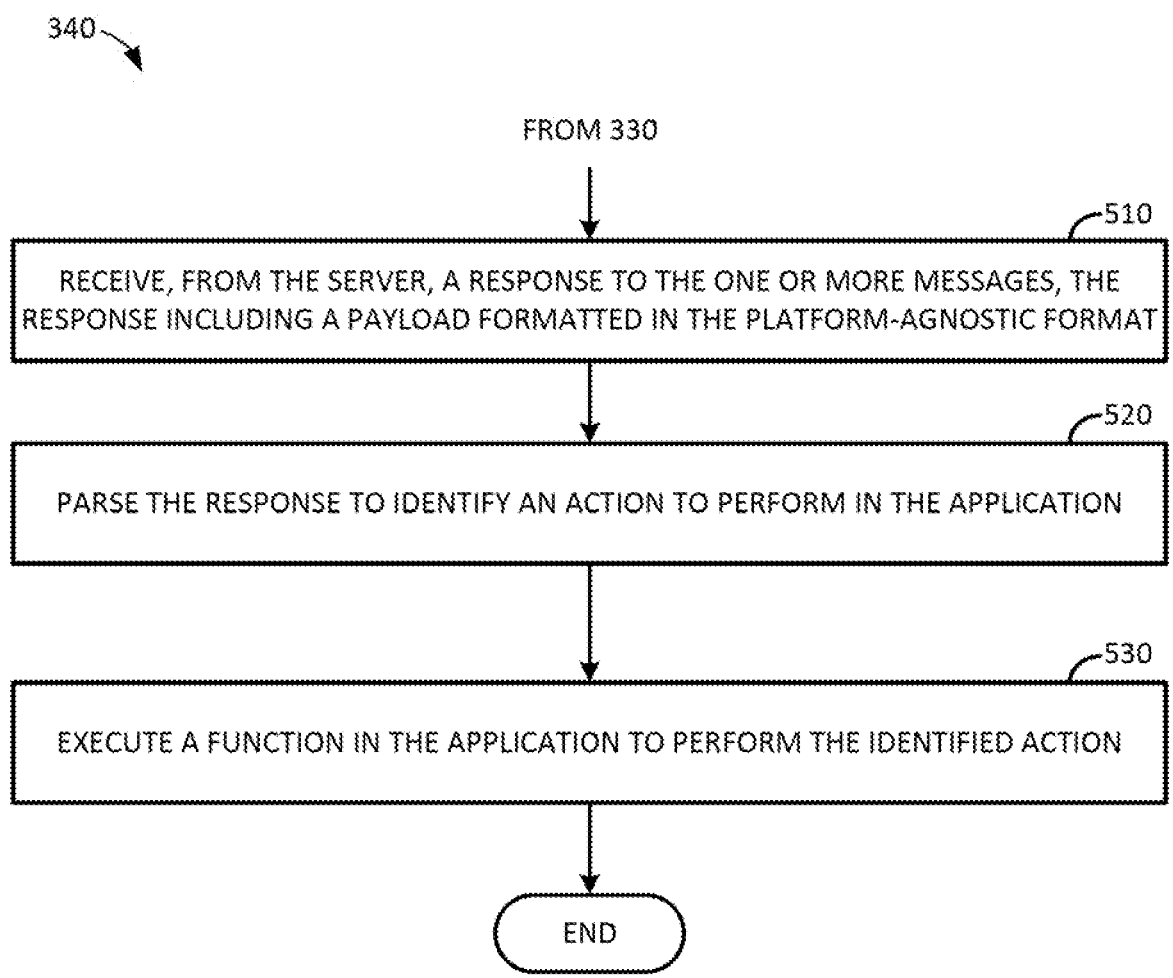
FIG. 5 illustrates example operations for executing functions within an application based on messaging exchanged between a client application and an application service via a persistent, bidirectional communications link.

FIG. 5 illustrates further details of block 340 illustrated in FIG. 3 for taking one or more actions within the application based on the streaming data related to the event and carried on the persistent connection. As illustrated, block 340 begins at block 510, where a response to one or more messages is received from the server. The response generally includes a payload formatted in the platform-agnostic format and is generally received on the persistent connection. The platform-agnostic format may generally be a format in which messages correspond to a shared, defined protocol and can encapsulate various application-specific payloads. The response may be, for example, one or more messages generated in response to a request to invoke a specified function transmitted by a client application to an application server transmitted via the persistent connection.

At block 520, the response is parsed to identify an action to perform within the application. To identify the action to perform within the application, a mapping between event data included in the response and a function to invoke in the application can be used. Additionally, other data, such as the presence of data to be used in performing an action in the response, can be used to identify the action to perform within the application.

At block 530, a function is executed in the application to perform the identified action. Data carried in the response may be provided as input parameters to the function for execution of the function.

Figure 6:
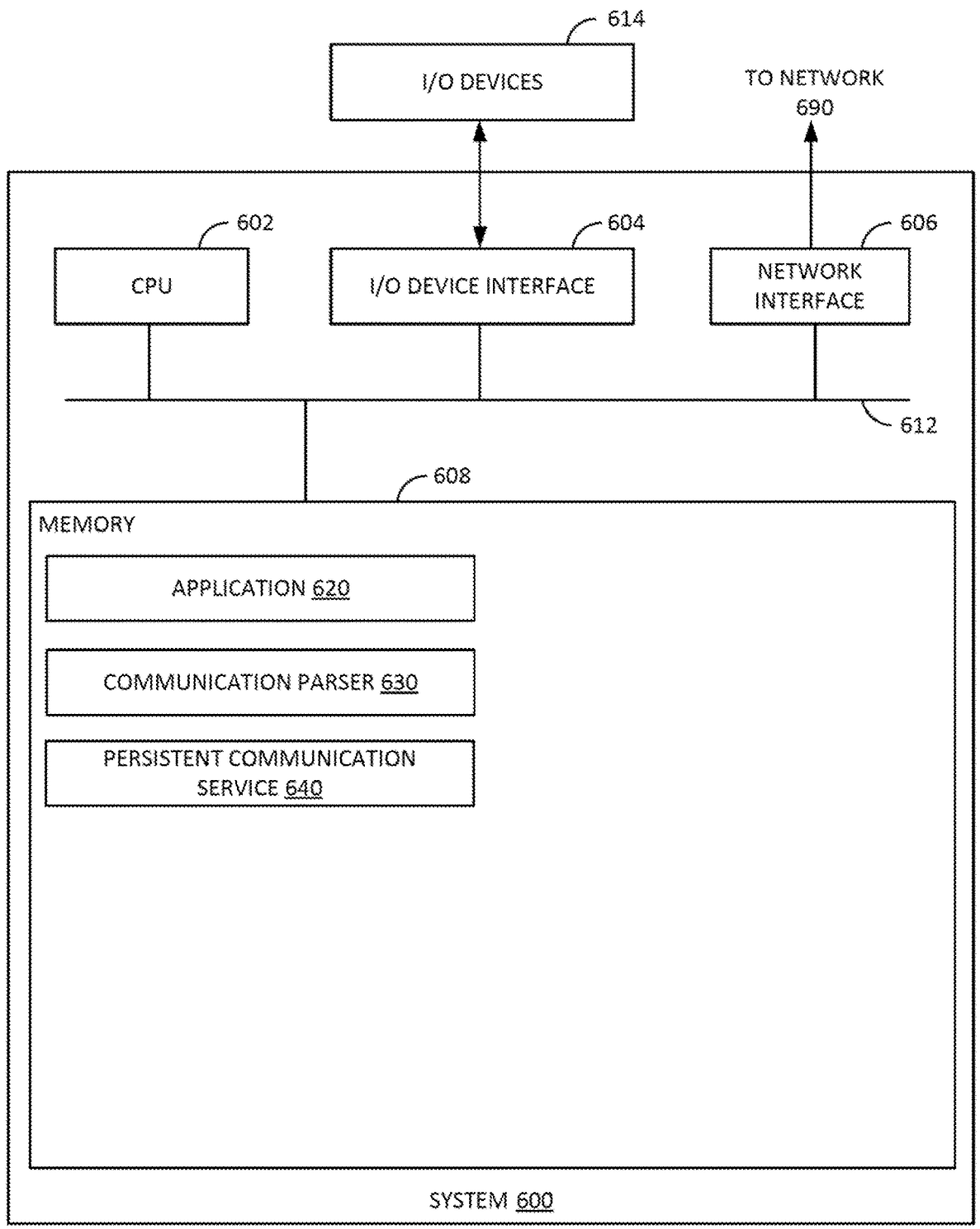
FIG. 6 illustrates an example system on which embodiments of the present disclosure can be performed.

Example System for Communicating Between a Client Application and an Application Service Using a Persistent Communication Service FIG. 6 illustrates an example system 600 in which a client application communicates with an application service via a persistent connection and a persistent communication service through which the persistent connection is maintained. System 600 may correspond to client device 110 illustrated in FIG. 1.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 604, and memory 608.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes a client application 620, communication parser 630, and persistent communication service 640.

Client application 620 generally corresponds to client application 112 illustrated in FIG. 1. Generally, client application 620 exposes a user interface through which a user can interact with an application service hosted at a remote application server. Client application 620 communicates with communication parser 630 via application messaging in an application-specific format to invoke functions at the application service and/or to identify functions to execute within client application 620.

Communication parser 630 generally corresponds to communication parser 114 illustrated in FIG. 1. Communication parser 630 generally translates between messaging in an application-specific format and messaging in a platform-agnostic format to allow client application 620 to communicate with an application service via a persistent, bidirectional connection which supports a limited set of functions for pushing data to, pulling data from, and/or asynchronously receiving data from an application service. Generally, when communication parser 630 receives messaging from an application service via persistent communication service 640, communication parser can translate the messaging into application-specific messaging to invoke a specified function in client application 620 using the payload of the received messaging (if any) as parameters for the specified function. When communication parser receives messaging from client application 620, communication parser can translate the received messaging into a platform-agnostic format to push data to and invoke functions at the application service.

Persistent communication service 640 generally corresponds to persistent communication service 116 illustrated in FIG. 1. Persistent communication service 640 generally maintains a subscription to a messaging service configured to listen for data from an application service hosted at a remote location and to publish data to the application service via the persistent connection. Persistent communication service 640 may, in some cases, be hosted in a webview, or embedded web browser, hidden from a user of client application 112. This webview may be instantiated when client application 112 is initially loaded and may be terminated when client application 112 is terminated.

Note that FIG. 6 is just one example of a system, and other systems including fewer, additional, or alternative components are possible consistent with this disclosure.

EXAMPLE CLAUSES

Clause 1: A method, comprising: initializing a persistent connection between an application executing on a client device and a server; receiving information about an event within the application; communicating between the application and the server via streaming data related to the information about the event carried on the persistent connection, the streaming data having been translated from an application-native format to a platform-agnostic format and including application-specific information; and taking one or more actions within the application based on the streaming data related to the event and carried on the persistent connection.

Clause 2: The method of Clause 1, wherein the persistent connection comprises a bidirectional connection between the application and the server, such that the application can transmit data to the server and receive data from the server on a same connection.

Clause 3: The method of any one of Clauses 1 or 2, wherein the persistent connection comprises a connection over which the application and the server communicate via a streaming protocol.

Clause 4: The method of any one of Clauses 1 through 3, wherein the streaming data comprises messaging related to events within the application.

Clause 5: The method of any one of Clauses 1 through 4, wherein the streaming data comprises media data transferred between the application and the server.

Clause 6: The method of any one of Clauses 1 through 5, wherein initializing the persistent connection between the application and the server comprises: initializing an instance of a web view within the application, wherein the instance of the web view is hidden from a user of the application; loading a web page in the instance of the web view; and subscribing, through the web page, to a messaging service configured to listen for data from and publish data to the server via the persistent connection.

Clause 7: The method of Clause 6, further comprising: terminating, through the web page in the instance of the web view, the subscription to the messaging service; and upon terminating the subscription to the messaging service, terminating execution of the application.

Clause 8: The method of any one of Clauses 6 or 7, wherein the web view is configured to translate streaming data events received from the application into a streaming protocol-specific format for transmission over the persistent connection.

Clause 9: The method of any one of Clauses 1 through 8, wherein communicating between the application and the server comprises: generating messages based on a mapping between the application-specific information and a payload to be encapsulated in the messages transmitted on the persistent connection; and transmitting the messages to the server.

Clause 10: The method of Clause 9, wherein the one or more messages include information identifying the event within the application and one or more parameters for the server to use in executing a function related to the event.

Clause 11: The method of any one of Clauses 9 or 10, wherein taking the one or more actions within the application based on the one or more messages communicated via the one or more messages carried on the persistent connection comprises: receiving, from the server, a response to the one or more messages, the response including payload formatted in the platform-agnostic format; parsing the response to identify an action to perform in the application; and executing a function in the application to perform the identified action.

Clause 12: The method of any one of Clauses 1 through 11, wherein: communicating between the application and the server comprises receiving, on the persistent connection, messages from the server, the messages including payloads formatted in the platform-agnostic format; and taking the one or more actions within the application comprises: identifying, from the received messages, an action to perform in the application; and executing one or more functions to perform the identified action in the application.

Clause 13: The method of Clause 12, wherein the payloads of the one or more messages include parameters for the application to use in executing the one or more functions to perform the identified action in the application.

Clause 14: A system, comprising: a memory having executable instructions stored thereon; and a processor configured to execute the executable instructions to perform the methods of any one of Clauses 1 through 13.

Clause 15: A system, comprising: means for performing the methods of any one of Clauses 1 through 13.

Clause 16: A computer-readable medium having instructions stored thereon which, when executed by a processor, performs the methods of any one of Clauses 1 through 13.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   initializing a persistent connection between an application executing on a client device and an application service executing on a remote server, wherein initializing the persistent connection between the application executing on the client device and the application service executing on the remote server comprises:
      initializing an instance of a web view within the application, wherein the instance of the web view is hidden from a user of the application;
      loading a web page in the instance of the web view; and
      subscribing, through the web page, to a messaging service configured to listen for data from and publish data to the server via the persistent connection;

receiving information about an event within the application;

communicating between the application executing on the client device and the application service executing on the remote server via streaming data related to the information about the event carried on the persistent connection between the application and the application service, the streaming data having been translated from an application-native format to a platform-agnostic format and including application-specific information; and taking one or more actions within the application based on the streaming data related to the event and carried on the persistent connection.

2. The method of claim 1, wherein the persistent connection comprises a bidirectional connection between the application and the server, such that the application can transmit data to the server and receive data from the server on a same connection.

3. The method of claim 1, wherein the persistent connection comprises a connection over which the application and the server communicate via a streaming protocol.

4. The method of claim 1, wherein the streaming data comprises messaging related to events within the application.

5. The method of claim 1, wherein the streaming data comprises media data transferred between the application and the server.

6. The method of claim 1, further comprising:
terminating, through the web page in the instance of the web view, the subscription to the messaging service; and
upon terminating the subscription to the messaging service, terminating execution of the application.

7. The method of claim 1, wherein the web view is configured to translate streaming data events received from the application into a streaming protocol-specific format for transmission over the persistent connection.

8. The method of claim 1, wherein communicating between the application and the server comprises:
generating messages based on a mapping between the application-specific information and a payload to be encapsulated in the messages transmitted on the persistent connection; and
transmitting the messages to the server.

9. The method of claim 8, wherein the one or more messages include information identifying the event within the application and one or more parameters for the server to use in executing a function related to the event.

10. The method of claim 8, wherein taking the one or more actions within the application based on the one or more messages communicated via the one or more messages carried on the persistent connection comprises:
receiving, from the server, a response to the one or more messages, the response including payload formatted in the platform-agnostic format;
parsing the response to identify an action to perform in the application; and
executing a function in the application to perform the identified action.

11. The method of claim 1, wherein:
communicating between the application and the server comprises receiving, on the persistent connection, messages from the server, the messages including payloads formatted in the platform-agnostic format; and
taking the one or more actions within the application comprises:

identifying, from the received messages, an action to perform in the application; and
executing one or more functions to perform the identified action in the application.

12. The method of claim 11, wherein the payloads of the one or more messages include parameters for the application to use in executing the one or more functions to perform the identified action in the application.

13. A system, comprising:
a computer-readable memory having executable instructions stored thereon; and
a processor configured to execute the executable instructions to cause the system to:
initialize a persistent connection between an application executing on a client device and an application service executing on a remote server, wherein in order to initialize the persistent connection between the application executing on the client device and the application service executing on the remote server, the processor is configured to cause the system to:
initialize an instance of a web view within the application, wherein the instance of the web view is hidden from a user of the application;
load a web page in the instance of the web view; and
subscribe, through the web page, to a messaging service configured to listen for data from and publish data to the server via the persistent connection;
receive information about an event within the application;
communicate between the application executing on the client device and the application service executing on the remote server via streaming data related to the information about the event carried on the persistent connection between the application and the application service, the streaming data having been translated from an application-native format to a platform-agnostic format and including application-specific information; and
take one or more actions within the application based on the streaming data related to the event and carried on the persistent connection.

14. The system of claim 13, wherein the persistent connection comprises a bidirectional connection between the application and the server, such that the application can transmit data to the server and receive data from the server on a same connection.

15. The system of claim 13, wherein the processor is further configured to:
terminate, through the web page in the instance of the web view, the subscription to the messaging service; and
upon terminating the subscription to the messaging service, terminate execution of the application.

16. The system of claim 13, wherein in order to communicate between the application and the server, the processor is configured to:
generate messages based on a mapping between the application-specific information and a payload to be encapsulated in the messages transmitted on the persistent connection; and
transmit the messages to the server.

17. The system of claim 13, wherein:
in order to communicate between the application and the server, the processor is configured to receive, on the persistent connection, messages from the server, the messages including payloads formatted in the platform-agnostic format; and in order to take one or more actions within the application, the processor is configured to:
identifying, from the received messages, an action to perform in the application; and
executing one or more functions to perform the identified action in the application.

* * * * *